Aug. 9, 1949.  R. B. POLLMAN  2,478,315
ARCHITECT'S INSTRUMENT FOR DETERMINING THE
DIRECTION OF THE SUN'S RAYS
Filed March 22, 1945  2 Sheets-Sheet 1
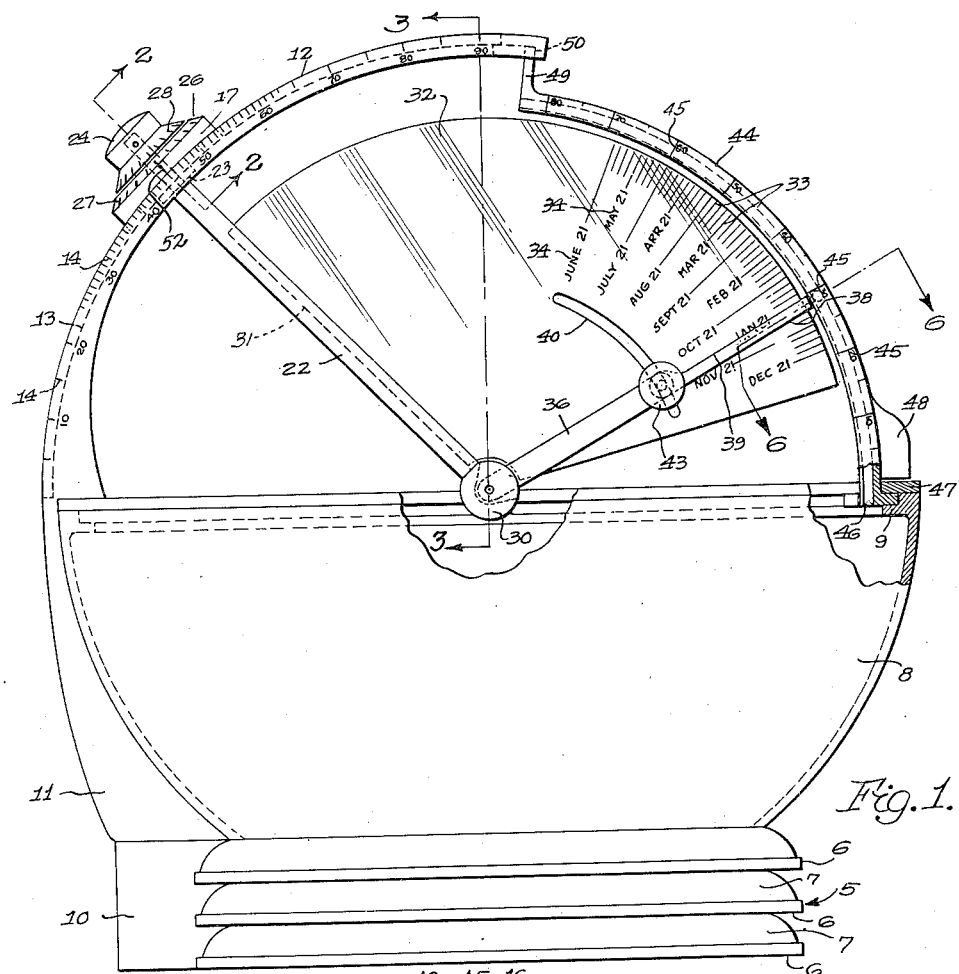
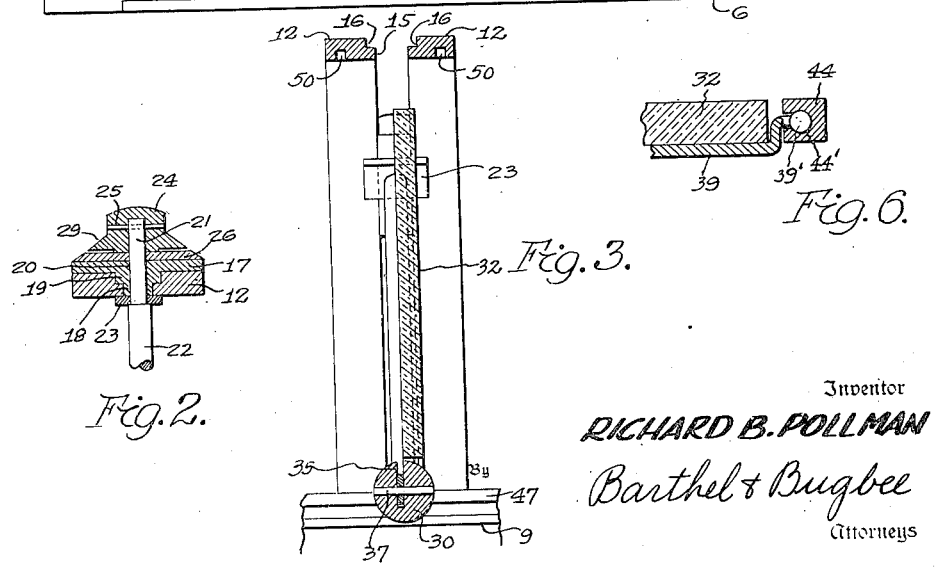
Inventor
RICHARD B. POLLMAN
Barthel & Bugbee
Attorneys Aug. 9, 1949.   R. B. POLLMAN   2,478,315
ARCHITECT'S INSTRUMENT FOR DETERMINING THE
DIRECTION OF THE SUN'S RAYS
Filed March 22, 1945   2 Sheets-Sheet 2

Inventor
RICHARD B. POLLMAN
By Barthel & Bugbee
Attorneys

Patented Aug. 9, 1949

2,478,315

UNITED STATES PATENT OFFICE 2,478,315

ARCHITECT'S INSTRUMENT FOR DETERMINING THE DIRECTION OF THE SUN'S RAYS

Richard B. Pollman, Detroit, Mich.

Application March 22, 1945, Serial No. 584,053

7 Claims. (Cl. 33—1)

The present invention relates to improvements in architects' surveying instruments.

The primary object of the invention is to provide an inexpensive instrument for measuring the inclination of the sun and the sun's rays with respect to the azimuth and horizon so that the architect may have this data and information before him when designing buildings employing specially constructed windows adapted to take advantage of the heat from the sun's rays during winter months and to exclude heat during summer months.

Another object of the invention is to provide an architects' instrument which may be employed during the designing of buildings and the like to properly orient the building to such a position as to take advantage of the sun's rays during winter months for partially heating the building by permitting the sun's rays to pass through the windows of the building at a time when the intensity of the heat of the sun's rays is at a maximum.

Another object of the invention is to provide an architects' instrument which may be conveniently placed on the architect's desk so as to be accessible at all times to indicate the angularity of the sun's rays when designing buildings and houses, whereby to provide suitable building plans with the windows and eaves properly located to take advantage of the radiant heat energy during winter months and exclude said heat energy during summer months.

Another object of the invention is to provide a device of the above-mentioned character which is ornamental in appearance, easy to manipulate and extremely accurate, whereby the architect may receive the necessary information concerning the angularity of the sun's rays in local regions as well as localities in various other latitudes without taking actual readings at the localities or sites of the buildings.

Other objects and advantages of the invention will become apparent during the course of the following description of the accompanying drawing, wherein:

Figure 1 is a side elevational view of the instrument embodying the invention showing the various graduated surfaces for providing the architect with an accurate reading as to the inclination of the sun's rays;

Figure 2 is a cross-sectional view taken on the oblique line 2—2 of Figure 1 looking in the direction of the arrows and showing the control knob of the indicating device for shifting the light line vane to the desired angle in accordance with the time of day;

Figure 3 is a vertical cross-sectional view taken on line 3—3 of Figure 1, looking in the direction of the arrows showing structural details of the architects' instrument;

Figure 4:
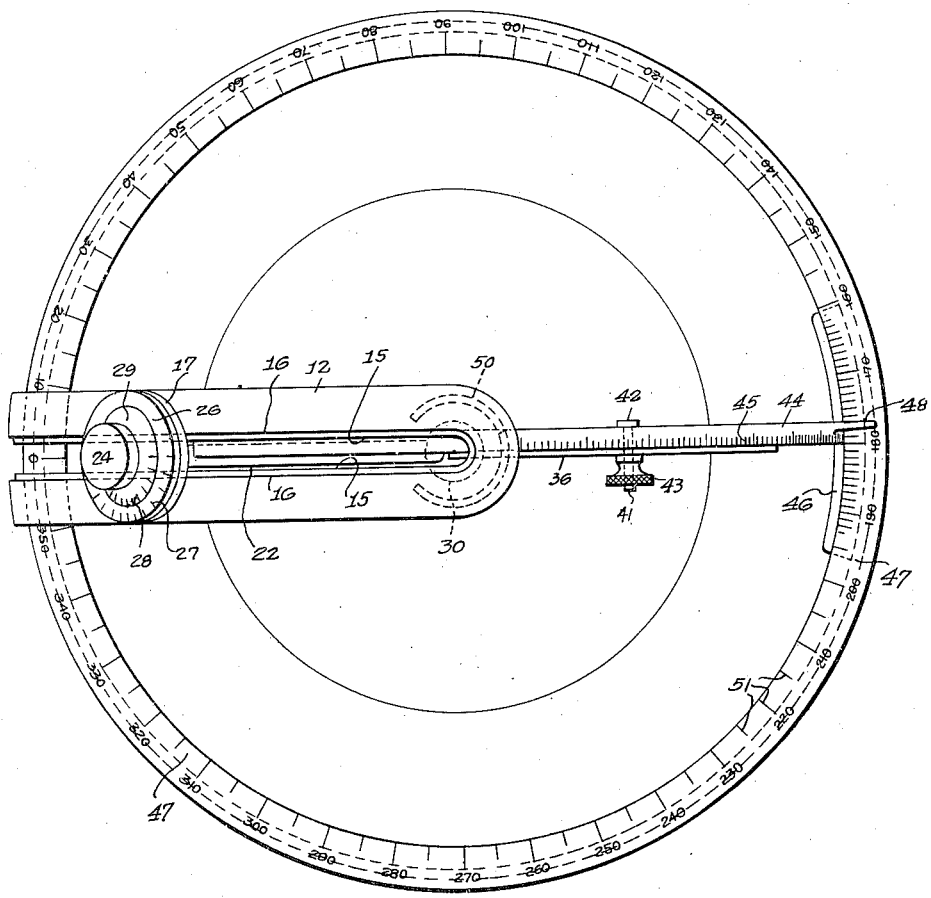
Figure 5:
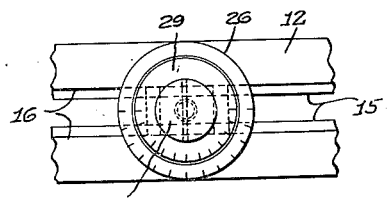

Figure 4 is a top elevational view of the architect's instrument showing the general contour of the base and the manner in which the indicating vane is disposed relative thereto; and Figure 5 is an enlarged fragmentary elevational view of the control knob showing the manner in which the same is graduated for the purpose of setting the indicating vane to an angle corresponding to the hour of the day; and Figure 6 is an oblique cross-sectional view taken on line 6—6 of Figure 1 looking in the direction of the arrows to illustrate the manner in which the pointer arm is connected to the protractor so that movement of the indicator arm about the axis of the control shaft will shift the protractor about its axis.

In the drawing, wherein for the purpose of illustrating the invention like reference characters will be employed throughout to designate like parts, the reference character 5 will generally be employed to designate a base of modernistic design and shape having a series of flanged portions 6 connected by curved surface portions 7. Formed on top of the base 5 is a bowl-shaped support 8 which terminates at its upper end in an inwardly extending flange 9. The base 5 is extended as at 10 to provide a foot portion for supporting an arcuately curved strip portion 11 embracing the bowl-shaped portion of the base 8. Formed integral with the arcuately curved strip portion 11 is an arcuately curved guide member 12 which projects above the bowl portion of the base 8 and terminates at its upper end adjacent the axis thereof. The arcuately curved guide 12 is provided with a graduated scale 13 having graduation marks 14 to indicate degrees of latitude for a purpose which will hereinafter be described.

The guide 12 is provided with a slot 15 having opposed chamfered edges 16 for slidably receiving a slide 17 which is rounded and provided on its underside with a diametrically disposed rib 18 adapted to be received in the slot 15 with enlarged portions thereof as at 19 received in the chamfered portions 16 of said slot. The slide is provided with a bore 20 for receiving the reduced end 21 of a rotatable shaft 22 which projects inwardly to the center of the arcuately curved guide strip 12 as clearly shown in Figure 1. A washer or the like as at 23 is interposed between the enlarged portion of the shaft 22 and the underside of the arcuately curved slide guide 12, and a knob 24 is secured to the reduced portion 21 of the shaft and held in place by a locking pin 25. The slide 17 is thus held in place against displacement by the washer 23 and knob 24 and interposed between the knob 24 and the slide 17 is a graduated disc 26 having graduation markings 27 thereon adapted to register with graduations 28 on the beveled skirt portion 29 of the knob 24. The inner end of the rotatable shaft 22 is provided with a spherical head member 30 and said rotary shaft is provided with a longitudinally extending offset slot 31 for receiving one of the angular edges of a sector-shaped light-ray vane 32. The light-ray vane 32 is formed of a suitable transparent plastic material and affixed to the rod 22 by suitable adhesive or other means so as to swing about the axis of the shaft 22 when the knob 24 is rotated. The light-ray vane 32 is provided with a graduated scale 33 having legends 34 denoting the various months of the year. The graduations between the legends 34 are intended to represent weeks between the various legends or the space between the legends may be graduated to represent days by dividing the graduations denoting weeks into seven equal parts.

Formed in the spherical head 30 is a sector-shaped slot 35 for receiving the inner end of a pivoted indicating arm or pointer 36 which is pivotally held in place by means of a pivot pin 37 extending through suitable openings on opposite sides of the sector-shaped slot 35. The free end of the pointer arm 36 is provided with a pointer 38 having a straight edge portion 39 adapted to register with the graduations 33 and legends 34 as shown clearly in Figure 1. The free end of the pointer 36 is provided with a spherical tip 39'. An arcuate slot 40 is formed in the sector-shaped light-ray vane 32 for receiving a bolt 41 having a head portion 42 at one end thereof for preventing the bolt from passing through the slot 40 when said bolt is arranged therein. The other end of the bolt extends through an aperture in the indicator arm 36 and is threaded for receiving the thumb nut 43 to facilitate the clamping of the indicator arm 36 in a predetermined position upon the light-ray vane 32 with the straight edge 39 of the indicator arm in registry with one of the graduations 33.

Movably supported between the bowl-shaped portions of the base 8 and the free end of the arcuately curved slide guide 12 is a protractor 44 which is provided with a groove 44' for receiving the spherical tip 39' of the indicator arm 36. Also the protractor 44 is provided with a series of degree markings or graduations 45 (Figure 1) with which the pointer 38 is adapted to register and align. The lower portion of the protractor 44 is provided with an arcuately curved foot 46 which is supported on the inwardly extending flange 9 of the bowl-shaped support 8, and a clamping ring 47 is disposed on the top edge of said bowl 8 so that the inner end of said ring overlies the foot 46 on the lower end of the protractor. A rib 48 is formed integral with the protractor 44 and provides a portion for overlying the clamping ring 47. Screws or other fastening elements may be provided for securing the clamping ring 47 in place on the top edge of the bowl-shaped support 8. The upper end of the protractor 44 is provided with an extension 49, the free end of which is received in an arcuate slot 50 formed in the extreme free end of the slide guide 12 as shown more clearly in Figure 4. It will thus be seen that the protractor 44 may be swung about an arc with respect to the base or bowl 8 and the top of the clamping ring 47 is provided with a compass or solar azimuth scale having a series of degree markings 51 with which the projection 48 is adapted to register when the architects' instrument is used during the orientation of the building plan so that the building will face in the proper direction to receive radiant heat energy during the winter months and exclude the sun's rays during the summer months.

In operation, the slide 17 is moved along the slide guide 12 until the pointer thereon as at 52 registers with one of the degree markings of the latitude scale 13 corresponding to the latitude of the locality in which the building is constructed. As shown in Figure 1, the slide 17 is moved to a position of approximately 46 degrees latitude so that the shaft 22 will be at an angle with respect to the horizon. After the slide 17 has thus been set, the indicator arm 36 is moved to a position in which the straight edge 39 registers with one of the legends 34 denoting the month in which the inclination of the sun's rays is to be determined. By manipulating the thumb screw 43, the indicator arm 36 may be kept at a predetermined position and locked against movement during the manipulation of the light-ray vane 32 which will be later described.

As pointed out above, the graduations 27 and 28 on the disc 26 and skirt portion 29 of the knob 24 are intended to indicate hours of the day and as shown in Figure 4, the graduations 28 on the skirt 29 of the knob are formed about one half or 180 degrees of the circumference thereof. The graduations 27 on the adjustable disc 26 may be shifted by rotating the disc 26 a slight amount to provide for the indication of fractions of an hour or minutes. The knob 24 is adapted to be rotated until the graduations 28 denoting the hour at which the inclination of the sun's rays is to be determined, register with one of the graduations 27 and when said knob is rotated, the shaft 22 is likewise rotated in the bearing opening 20 of the slide 17 so as to oscillate the sector-shaped light-ray vane 32 to a predetermined position. When the light-ray vane 32 is moved to its predetermined position, the protractor 44 is moved, by the sliding engagement of the ball tip 39' of the pointer 36 (Figure 6) with the groove 44' in the protractor 44, automatically about the axis of the bowl-shaped base 8 until one of the altitude graduations thereon as at 45 registers with the end of the pointer 38 and at the same time one of the azimuth graduations 51 registers with the projection 48. From the graduations 45 on the protractor 44, the exact inclination or angular altitude of the sun's rays and from the graduations 51 its azimuth may be determined, whereby the architect may then draft his building plans so as to take advantage of the sun's rays during winter months for partially heating the house by permitting the sun's rays to pass through windowed openings therein, and to so position the building or house and the eaves thereof to exclude the sun's rays during the summer or warm months to maintain the house in a cool condition.

It is to be understood that the form of the invention herewith shown and described is to be taken as a preferred embodiment of the same and that various changes may be made in the shape, size and arrangement of parts without departing from the spirit of the invention or the scope of the subjoined claims.

What I claim is:

1. An architect's instrument, comprising a base, an arcuate slide guide carried by said base having a graduated latitude scale, a slide mounted for movement in an arcuate path on said slide guide, a rotary shaft journaled in said slide and swingable therewith, an indicator vane secured to said shaft to swing therewith and having a scale graduated to denote months and days, an hour scale correlated with the rotation of said shaft to effect tilting of said vane into alignment with the inclination of the sun's rays at the desired hour of the day, an indicator arm pivoted to the said shaft and registrable with said month and day scale, and a protractor swingably mounted relatively to said base and slide guide having a solar altitude scale thereon registrable with said arm.

2. An architects' instrument, comprising a base, an arcuate slide guide carried by said base having a graduated latitude scale, a slide mounted for movement in an arcuate path on said slide guide, a rotary shaft journaled in said slide and swingable therewith, an indicator vane secured to said shaft to swing therewith and having a scale graduated to denote months and days, an hour scale correlated with the rotation of said shaft to effect tilting of said vane into alignment with the inclination of the sun's rays at the desired hour of the day, a head on the lower end of said shaft, an indicator arm pivoted to said head on the said shaft and registrable with said month-and-day scale, a protractor swingably mounted relatively to said base and slide guide having a solar altitude scale thereon registrable with said arm.

3. An architects' instrument, comprising a base, an arcuate slide guide carried by said base having a graduated latitude scale, a slide mounted for movement in an arcuate path on said slide guide, a rotary shaft journaled in said slide and swingable therewith, an indicator vane secured to said shaft to swing therewith and having a scale graduated to denote months and days, an hour scale correlated with the rotation of said shaft to effect tilting of said vane into alignment with the inclination of the sun's rays at the desired hour of the day, an indicator arm pivoted to the said shaft and registrable with said month and day scale, a protractor swingably mounted relatively to said base and slide guide, a coupling connected between said indicating arm and said protractor and having relatively movable engagement therewith, said protractor having a solar altitude scale thereon registrable with said arm and a solar azimuth scale on said base, said protractor having a pointer thereon registrable with said azimuth scale.

4. An architects' instrument, comprising a base, an arcuate slide guide carried by said base having a graduated latitude scale, a slide mounted for movement in an arcuate path on said slide guide, a rotary shaft journaled in said slide and swingable therewith, an indicator vane secured to said shaft to swing therewith and having a scale graduated to denote months and days, an hour scale correlated with the rotation of said shaft to effect tilting of said vane into alignment with the inclination of the sun's rays at the desired hour of the day, an indicator arm pivoted to the said shaft and registrable with said month and day scale, a protractor swingably mounted relatively to said base and slide guide having a solar altitude scale thereon registrable with said arm and a solar azimuth scale on said base, said protractor having a pointer thereon registrable with said azimuth scale, said indicating arm of said vane being mechanically coupled to said protractor to swing said protractor in synchronism with the tilting of said vane whereby to automatically move said arm to indicate the solar altitude on said protractor and also to move said protractor to indicate the solar azimuth on said azimuth scale.

5. An architects' instrument for indicating the inclination of the sun's rays at a predetermined time in a predetermined latitude, comprising a base, an arcuately curved slide guide extending upwardly from said base having a guide slot, said slide guide being provided with a graduated scale to denote latitude, a slide movably mounted in the slot in said arcuately curved slide guide, a rotary shaft supported by said slide extending inwardly to the center of said arcuately curved slide guide, a light ray indicator vane mounted on said rotary shaft, an hour scale correlated with the rotation of said shaft to adjust said indicator vane to a position of alignment with the inclination of the sun's rays at a predetermined time of day, a month-and-day scale on said vane, a pivoted indicator arm secured to the inner end of said shaft movable over said month-and-day scale on the indicator vane, and a protractor having degree markings thereon movably carried by the base and arcuately curved guide and registrable with said indicator arm to indicate the inclination of the sun's rays at a particular time in a predetermined latitude.

6. An architect's instrument for indicating the inclination of the sun's rays at a predetermined time in a predetermined latitude, comprising a base, an arcuately curved slide guide extending upwardly from said base having a guide slot, said slide guide being provided with a graduated scale to denote latitude, a slide movably mounted in the slot in said arcuately curved slide guide, a rotary shaft supported by said slide extending inwardly to the center of said arcuately curved slide guide, a light ray indicator vane mounted on said rotary shaft, an hour scale correlated with the rotation of said shaft to adjust said indicator vane to a position of alignment with the inclination of the sun's rays at a predetermined time of day, a month-and-day scale on said vane, a pivoted indicator arm secured to the inner end of said shaft movable over said month-and-day scale on the indicator vane, a protractor having degree markings thereon movably carried by the base and arcuately curved guide and registrable with said indicator arm to indicate the inclination of the sun's rays at a particular time in a predetermined latitude, a coupling connected between said indicating arm and said protractor and having relatively movable engagement therewith and a solar azimuth scale on said base, said protractor having a pointer thereon registrable with said azimuth scale.

7. An architect's instrument for indicating the inclination of the sun's rays at a predetermined time in a predetermined latitude, comprising a base, an arcuately curved slide guide extending upwardly from said base having a guide slot, said slide guide being provided with a graduated scale to denote latitude, a slide movably mounted in the slot in said arcuately curved slide guide, a rotary shaft supported by said slide extending inwardly to the center of said arcuately curved slide guide, a light ray indicator vane mounted on said rotary shaft, an hour scale correlated with the rotation of said shaft to adjust said indicator vane to a position of alignment with the inclination of the sun's rays at a predetermined time of day, a month-and-day scale on said vane, a pivoted indicator arm secured to the inner end of said shaft movable over said month-and-day scale on the indicator vane, and protractor having degree markings thereon movably carried by the base and arcuately curved guide and registrable with said indicator arm to indicate the inclination of the sun's rays at a particular time in a predetermined latitude, said shaft being provided with a spherical end portion having a slot for pivotally receiving one end of the pivoted indicator.

RICHARD B. POLLMAN.

REFERENCES CITED

The following references are of record in the file of this patent:

UNITED STATES PATENTS

| Number | Name | Date |
| --- | --- | --- |
| 686,127 | Potter | Nov. 5, 1901 |
| 2,151,970 | Hobbs | Mar. 28, 1939 |
| 2,367,128 | Jorgensen | Jan. 9, 1945 |

FOREIGN PATENTS

| Number | Country | Date |
| --- | --- | --- |
| 81,062 | Austria | Aug. 10, 1920 |
| 90,985 | Switzerland | Jan. 16, 1922 |